2,995,573
NOVEL PRODUCTS AND METHODS FOR PREPARING ACETALS OF ALPHA-KETO ALDEHYDES
Harry A. Stansbury, Jr., Charleston, and David T. Manning, South Charleston, W. Va., assignors to Union Carbide Corporation, a corporation of New York
No Drawing. Filed Feb. 18, 1959, Ser. No. 793,975
10 Claims. (Cl. 260—340.9)

This invention relates to novel methods for preparing acetals of alpha-keto aldehydes and to novel and useful acetals. More particularly, this invention relates to certain novel acetals of alpha-keto aldehydes and to methods for producing this class of acetals by the reaction of nitrosyl chloride, an alcohol, and certain methyl ketones.

The prior art methods for producing acetals of alpha-keto aldehydes such as phenylglyoxal diethyl acetal have employed a multiplicity of steps and the use of toxic or expensive reagents.

It has now been found that acetals of alpha-keto aldehydes can be produced by reacting nitrosyl chloride with a mixture of an alcohol and a methyl ketone wherein the carbonyl radical of the ketone is attached to the methyl group and to a carbon atom of the hydrocarbon residue which has all of its valences satisfied by attachment to carbon atoms.

The methods of this invention produce a number of well known acetals of alpha-keto aldehydes and also acetals which are novel and useful compounds. The resulting compounds of the methods of this invention can have cyclic acetal structures or open chain acetal structures. Illustrative of the acetals of alpha-keto aldehydes which can be produced by the methods of this invention are: phenylglyoxal dimethyl acetal; phenylglyoxal diethyl acetal; phenylglyoxal dibutyl acetal; tert-butylglyoxal dimethyl acetal; the ethylene glycol acetal of tert-butylglyoxal; the diethyl acetal of tert-butylglyoxal; the dimethyl acetal of 3,3-dimethyl-1,2-pentanedione; the propylene glycol acetal of (1-methylcyclohexyl) glyoxal; m-nitrophenylglyoxal dimethyl acetal; p-methoxyphenylglyoxal diethyl acetal; 3,3-diethyl-1,2-pentanedione diethyl acetal; 3,3-dimethyl-1,2-hexanedione dimethyl acetal; p-phenylphenylglyoxal diethyl acetal; and the like.

The methyl ketones suitable for use in this invention can also be referred to as acetylhydrocarbons. By the term "hydrocarbons" it is intended to include substituted hydrocarbons. The ketone starting materials can be represented by the general formula:

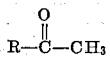

wherein R is a hydrocarbon radical or substituted hydrocarbon radical and the methyl ketone group is attached to R, the hydrocarbon residue (hydrocarbyl), by a carbon atom of the hydrocarbon residue which has all of its valences satisfied by carbon atoms. The hydrocarbon or substituted hydrocarbon radical can be an aromatic radical such as phenyl, naphthyl, anthracyl and their various substituted derivatives; an aliphatic radical such as those containing from about 4 to 15 carbon atoms and preferably from 4 to 8 carbon atoms; or a cycloaliphatic radical such as 1-methylcyclohexyl. The hydrocarbon radicals contemplated can carry substituents such as those of the lower alkyl, halogen, nitro and alkoxy radicals. Illustrative of the methyl ketones employed there can be mentioned: tert-butyl methylketone; 3,3-dimethyl-2-pentanone; methyl(1-methylcyclohexyl) ketone; acetophenone; n-methoxyacetophenone; p-nitroacetophenone; o-chloracetophenone; p-ethylacetophenone; naphthyl methyl ketone; 3-methyl-naphthyl methyl ketone; phenanthryl methyl ketone; p-phenylacetophenone; 3,3-diethyl-2-pentanone; 3,3-dimethyl-2-hexanone; and the like.

The alcohols employed in this invention are the saturated aliphatic or cycloaliphatic alcohols which can be either monohydric or polyhydric. The preferred alcohols are the saturated lower alkyl alcohols containing from 1 to about 6 carbon atoms. Illustrative of the alcohols there can be mentioned: alkyl alcohols having from 1 to about 6 carbon atoms such as methyl, ethyl, propyl, butyl, pentyl, cyclohexyl, hexyl, cyclopentyl, alcohols and the like; glycols containing from 2 to about 10 carbon atoms and preferably 2 to 6 carbon atoms such as ethylene glycol, propylene glycol, 1,2-butanediol, 1,2-pentanediol, 1,3-hexanediol, 1,3-propanediol, 1,3-butanediol, 2-ethyl-1,3-hexanediol, and the like; polyhydric alcohols having more than two hydroxyl groups such as glycerine, sorbitol, mannitol, erythritol, pentaerythritol, 2,2-di(hydroxylemethyl) propanol, and the like. It is preferable that the alcohol employed be anhydrous since water is formed in the reaction and an excess of water deleteriously affects the yields.

The nitrosyl chloride is reacted with an alcohol solution of a methyl ketone by feeding the nitrosyl chloride to the solution at a temperature of about 0° C. to about 90° C. The reaction temperature employed will vary somewhat according to the reactivity of the alcohol and the methyl ketone. Usually temperatures ranging from about 20° C. to about 80° C. are desirable. At temperatures much below about 20° C. such as 0° C. the acetal formation is slow, while oxidation by-products are formed at temperatures above 90° C. such as that of 100° C. A preferred temperature range is from about 40° C. to about 70° C.

The molar ratios of the reactants employed in the methods of this invention can vary over a wide range. Thus, about 2 to 50 moles of the alcohol are desirable and preferably about 5 to 20 moles per mole of nitrosyl chloride, while about 0.5 to 5 moles of nitrosyl chloride are desirable per mole of methyl ketone and preferably about 1 to 5 moles of nitrosyl chloride per mole of the methyl ketone. However, these molar ratios are not critical since when less than about one mole of nitrosyl chloride is employed such as 0.25 of a mole per mole of the ketone the reaction proceeds but the production rate of the acetal is low; on the other hand, no improvement in yield of acetal results by using more than about 5 moles of nitrosyl chloride, and larger amounts such as 10 moles decrease the yield of acetal and leads to the formation of undesirable oxidation by-products. The reaction time employed is not critical. Thus, the nitrosyl chloride can be reacted with the alcohol solution of methyl ketone for a period of time varying from 30 minutes to 10 hours. Longer reaction times can be employed but there is no corresponding advantage.

An illustrative embodiment of this invention is in the production of phenylglyoxal diethyl acetal by the following manner. Nitrosyl chloride is added to a stirred solution of acetophenone in ethanol at a temperature of about 20° C. to 30° C. wherein the molar ratio of nitrosyl chloride to acetophenone can vary from about 1 to 5 moles of nitrosyl chloride per mole of acetophenone. Five to 20 moles of substantially anhydrous ethanol are employed for each mole of nitrosyl chloride. The mixture is then brought up to a reaction temperature of from 40° C. to 60° C. and held at that temperature, with stirring for a period of about 1 to 3 hours to form the phenylglyoxal diethyl acetal. The phenylglyoxal diethyl acetal can be recovered from the reaction mixture desired in the following manner. Volatile materials are stripped out of the reaction mixture at slightly elevated temperatures and reduced pressures. The stripped residue is then added to a dilute solution of sodium hydroxide and the mixture is heated under reflux with vigorous stirring for a period of several hours. Upon cooling, the oily layer containing the phenylglyoxal diethyl acetal is extracted with ether, the ether extract is dried over anhydrous sodium sulfate, stripped, and distilled at reduced pressures to recover the phenylglyoxal diethyl acetal.

The acetals of the methyl ketones need not be isolated from the reaction mixture but can be used as formed. Thus, in the case of phenylglyoxal diethyl acetal the phenyl glyoxal can be produced in situ in the reaction mixture by hydrolysis under acidic conditions without need for isolation of the acetal prior to producing phenylglyoxal. A number of procedures for recovery of the pure acetal can be used. It is preferable to treat the crude reaction product with alkali to remove esters and acids formed as by-products and then recover the acetal by distillation. Suitable alkaline reagents which can be used are the hydroxides of the alkali and alkaline-earth metals such as sodium, potassium, and calcium.

When the ketone reactant is acetophenone and the alcohol is propylene glycol a novel acetal is produced; namely, 2-(4-methyl-1,3-dioxolan-2-yl)-2-phenyl-4-methyl-1,3-dioxolane. This compound is particularly stable and has utility as a plasticizer for resins such as polyvinylbutyral, cellulose acetate, ethyl cellulose and certain copolymers of vinyl chloride and vinyl acetate.

The acetals of alpha-keto aldehydes produced by the methods of this invention have utility as solvents, plasticizers or as intermediates for compounds possessing pharmacological activity uch as anthelmintic, tranquilizing, or antimalarial activity. When the ketone employed is acetophenone, the resulting acetal can serve as a source of phenylglyoxal by hydrolysis in the presence of a strong acid catalyst such as sulfuric acid. Phenylglyoxal diethyl acetal can be hydrogenated and then hydrolyzed to form mandelic aldehyde and ethanol.

EXAMPLE 1

A mixture of 120 grams of acetophenone (1 mole) and 1500 ml. of anhydrous ethanol was stirred at 25° C. to 30° C. while 107 grams of nitrosyl chloride (1.63 moles) were fed into the mixture over a period of 50 minutes. After adding the nitrosyl chloride the temperature was raised and the mixture was heated at 60° C. for two hours. The mixture was allowed to stand for 16 hours at 25° C. after which time the excess ethanol was stripped off at a maximum kettle temperature of 60° C. at 20 mm. The reaction mixture was extracted with aqueous sodium hydroxide to remove acidic by-products and then distilled at a temperature of about 129° C. to 134° C. at 10 mm. of mercury pressure to recover phenylglyoxal diethyl acetal contaminated with by-product esters. The latter were removed by refluxing the mixture with aqueous sodium hydroxide. Distillation of the ester-free oil gave 52.9 grams of pure acetal which had the following properties: boiling point of 133° C./10 mm.; $n_{20/D}$ 1.4998; specific gravity at 20/20° of 1.044. Analysis showed: 69.2% C. (theory 69.4%); and 7.63% H (theory 8.1%). The structure of this well known acetal was confirmed by both mass spectrometric analysis and its infrared absorption spectrum.

EXAMPLE 2

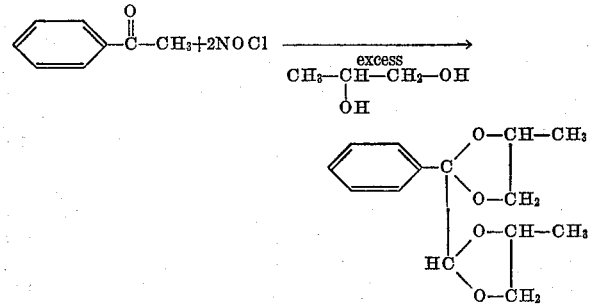

Formation of 2-(4-methyl-1,3-dioxolan-2-yl)-2-phenyl-4-methyl-1,3-dioxolane.—Acetophenone (120 grams, 1.0 mole) was partially dissolved in a mixture of propylene glycol (456 grams, 8.1 moles) and 1,000 ml. of benzene. The resulting mixture was stirred vigorously and 2.39 moles of nitrosyl chloride (110 ml. at −30° C.) was added dropwise at 20° C. to 30° C. over a period of 2.25 hours. During the addition an exothermic reaction occurred, and cooling was required to keep the temperature below 30° C. At the end of this period, stirring was continued for one hour at 25° C. to 35° C. and then for 1.5 to 2 hours at 60° C. During the reaction, approximately one mole of gas was liberated and found to consist entirely of nitrous oxide, nitric oxide, and nitrogen. The cooled reaction mixture consisted of two liquid layers which were separated. The upper layer was extracted five times with 500 ml. portions of water and freed of benzene on the steam bath, leaving 200 ml. of an orange colored oil. The lower layer was diluted with 1,000 ml. of water and extracted with six 500 ml. portions of ether. These extracts were combined, dried over sodium sulfate, and evaporated free of ether to give approximately 60 ml. of yellow oil. The organic oils from the two layers were combined and heated under reflux with 2,000 ml. of 2 N sodium hydroxide for a 1.5-hour period. The mixture was then cooled and extracted with ether to obtain (after evaporation of ether) 113–114 grams of an oil. Fractional distillation of the oil at reduced pressure gave 90.4 grams of 2-(4-methyl-1,3-dioxolan-2-yl)-2-phenyl-4-methyl-1,3-dioxolane (36% yield) as a heavy colorless syrup. The main fraction boiled at 147–152° C. at 3 mm. of mercury pressure and had an index of refraction $n_{20/D}$ of 1.5169. The 2-(4-methyl-1,3-dioxolan-2-yl)-2-phenyl-4-methyl-1,3-dioxolane was found on analysis to contain 66.4% C, 7.1% H and to have a molecular weight of 250. The calculated values for carbon and hydrogen and the molecular weight of this compound ($C_{14}H_{18}O_4$) are respectively; C, 67.2; H, 7.2 and a molecular weight of 250. The product possessed an infrared spectrum in agreement with the assigned structure, except for the absence of benzene bands at 6.2–6.35 microns. However, the presence of a benzene ring was confirmed by dichromate oxidation to benzoic acid.

EXAMPLE 3

Production of phenylglyoxal diethyl acetal.—Nitrosyl chloride, 171 grams (2.61 moles), was added to a stirred solution of 120 grams of acetophenone (1.0 mole) in 1500 ml. of ethanol at 24° C. to 30° C. over a 53-minute period. Upon completion of the feed, the reaction mixture was warmed to 63° C. over a period of 53 minutes and held there, with stirring, for 2.5 hours. Volatile materials were then removed by stripping to a kettle temperature of 60° C. at 20 mm. The stripped residue was added to 2,000 ml. of 2 N sodium hydroxide and the mixture heated under reflux, with vigorous stirring, for 1.5 hours. Upon cooling, the oily layer was extracted with ether, dried over anhydrous sodium sulfate, stripped of ether and distilled at reduced pressure. After removing a low-boiling fraction (11 grams), phenylglyoxal diethyl acetal (102 grams, 49% yield) was obtained as a colorless oil having a boiling point of about 128° C. at 10 mm. of mercury pressure, and a refractive index ($n_{20/D}$) of 1.4986.

EXAMPLE 4

Production of phenylglyoxal dimethyl acetal.—Nitrosyl chloride, 284 grams (4.35 moles), was reacted with acetophenone (240 grams, 2.0 moles) in 3,000 ml. of methanol under conditions similar to those described in Example 3. After treatment of the stripped residue with aqueous sodium hydroxide as in Example 3, and extraction with ether, the product was vacuum distilled to recover the phenylglyoxal dimethyl acetal. Phenylglyoxal dimethyl acetal (124.8 grams, 34.6% yield) was recovered as a fraction having the following boiling points: 133° C./16 mm., 123° C./10 mm. and 109° C./5 mm. (literature value 133° C./7 mm.). The refractive index of the acetal was $n_{20/D}$ 1.5161. The structure of phenylglyoxal dimethyl acetal was confirmed by infrared analysis.

EXAMPLE 5

This example illustrates the use of 2-(4-methyl-1,3-dioxolan-2-yl)-2-phenyl-4-methyl-1,3-dioxolane as a plasticizer for several synthetic resins.

Mixtures of the dioxolane compound with solutions of various resins were prepared as shown in Table I. Included in the tests, to serve as controls, were portions of each solution without plasticizer. Portions of each solution were poured on glass slides so as to form a film of approximately one mil thickness when dry. The films were air dried overnight and then force dried for 30 minutes at 175° F. The films were then examined for cloudiness using a rating of 10=clear, 0=very cloudy. Flexibility was rated using a rating of 10=very flexible, 5=medium flexible but not brittle, and 0=very brittle.

Table I

| | | | | | | |
|---|---|---|---|---|---|---|
| Dioxolane plasticizer (gms.) | 0 | 4 | 0 | 2 | 0 | 2 |
| Solution of resin A (gms.) [1] | 20 | 20 | | | | |
| Solution of resin B (gms.) [2] | | | 20 | 20 | | |
| Solution of resin C (gms.) [3] | | | | | 20 | 26.7 |
| Total grams | 20 | 24 | 20 | 22 | 20 | 28.7 |
| Ratio plasticizer to resin | 0/1 | .5/1 | 0/1 | .5/1 | 0/1 | .5/1 |
| Films dried 30 min. at 175° F.: | | | | | | |
| Clarity | 10 | 10 | 10 | 10 | 10 | 10 |
| Flexibility | 4 | 9 | 2 | 5 | 6 | 8 |

[1] A 40% solution of poly(vinyl acetate), (0.69 intrinsic viscosity in cyclohexanone at 20° C.), in a solvent consisting of toluene.
[2] A 20% solution of ethyl cellulose, standard ethoxy content 47.5-49% (10 centipoises in a 5% soln. in 80/20 toluene/ethanol) in a solvent of 80/20 toluene/ethanol.
[3] A 15% solution of poly(vinyl butyral) 7% hydroxyl content, (0.81 intrinsic viscosity in cyclohexanone at 20° C.), in a solvent consisting of 1/1 toluene/ethanol.

Table I shows that all the films were perfectly clear which shows that the test compound is compatible with each of the three synthetic resins. The 2-(4-methyl-1,3-dioxolan-2-yl)-2-phenyl-4-methyl-1,3-dioxolane increased significantly the flexibility of films formed from the three resins which shows that the dioxolane compound has good plasticizing efficiency.

What is claimed is:

1. A process for producing acetals of alpha-keto aldehydes which comprises reacting nitrosyl chloride, a saturated alcohol selected from the group consisting of aliphatic and cycloaliphatic monohydric and polyhydric alcohols, and a methyl ketone of the formula $$R-\overset{O}{\underset{\|}{C}}-CH_3$$

wherein R is a hydrocarbon radical selected from the group consisting of aromatic, aliphatic and cycloaliphatic radicals and the acetyl group is attached to said hydrocarbon radical through one of the carbon atoms of the hydrocarbon radical which has all of its valence bonds satisfied by carbon atoms.

2. A process for producing acetals of alpha-keto aldehydes which comprises reacting nitrosyl chloride with a saturated alcohol selected from the group consisting of aliphatic and cycloaliphatic, monohydric and polyhydric alcohols, and a methyl ketone, in which said nitrosyl chloride is added to a solution of said methyl ketone in said saturated alcohol wherein the molar ratio of methyl ketone varies from about 0.2 to about 4.0 per mole of nitrosyl chloride employed, said methyl ketone being represented by the formula $$R-\overset{O}{\underset{\|}{C}}-CH_3$$

wherein R represents a hydrocarbon radical selected from the group consisting of aromatic, aliphatic and cycloaliphatic radicals and the carbonyl group of said formula is attached to said hydrocarbon radical through one of the carbon atoms of the hydrocarbon radical which has all of its valence bonds satisfied by carbon atoms.

3. A process for producing acetals of phenylglyoxal which comprises reacting nitrosyl chloride with a saturated alcohol selected from the group consisting of aliphatic and cycloaliphatic, monohydric and polyhydric alcohols, and acetophenone, in which said nitrosyl chloride is added to a solution of acetophenone in said saturated alcohol at a temperature of about 0° C. to 90° C. wherein the solution of acetophenone and alcohol contains from 2 to 50 moles of alcohol and 0.2 to 4.0 moles of acetophenone per mole of nitrosyl chloride to form an acetal of phenylglyoxal.

4. The process of claim 3 wherein the alcohol employed is methanol.

5. The process of claim 3 wherein the alcohol employed is ethanol.

6. The process of claim 3 wherein the alcohol employed is a lower alkyl alcohol containing from 1 to about 6 carbon atoms.

7. The process of claim 3 wherein the alcohol is a glycol containing from 2 to about 10 carbon atoms.

8. A process for producing phenylglyoxal diethyl acetal which comprises reacting nitrosyl chloride with an ethanol solution of acetophenone at a temperature of about 0° C. to about 90° C. wherein the molar ratio of the reactants is from about 2 to about 50 moles of ethanol and about 0.2 to about 4.0 moles of acetophenone per mole of nitrosyl chloride.

9. As a new compound 2-(4-methyl-1,3-dioxolan-2-yl)-2-phenyl-4-methyl-1,3-dioxolane.

10. The process for producing 2-(4-methyl-1,3-dioxolan-2-yl)-2-phenyl-4-methyl-1,3-dioxolane which comprises reacting nitrosyl chloride with a propylene glycol solution of acetophenone at a temperature of about 0° C. to about 90° C. wherein the molar ratio varies from about 2 to about 50 moles of propylene glycol and from about 0.2 to about 4.0 moles of acetophenone per mole of nitrosyl chloride.

No references cited.

UNITED STATES PATENT OFFICE
CERTIFICATE OF CORRECTION

Patent No. 2,995,573                        August 8, 1961

Harry A. Stansbury Jr., et al.

It is hereby certified that error appears in the above numbered patent requiring correction and that the said Letters Patent should read as corrected below.

Column 2, line 66, after "mixture" insert -- if --; column 3, line 28, for "uch" read -- such --; column 5, line 3, for "C./7 mm." read -- C./16 mm. --; lines 54 to 56, the formula should appear as shown below instead of as in the patent:

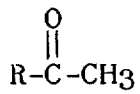

Signed and sealed this 24th day of April 1962.

(SEAL)
Attest:

ESTON G. JOHNSON
Attesting Officer

DAVID L. LADD
Commissioner of Patents